(12) United States Patent
Kosakura

(10) Patent No.: US 10,261,333 B2
(45) Date of Patent: Apr. 16, 2019

(54) SYSTEM FOR SIMULATING PYROTECHNICS

(71) Applicant: Disney Enterprises, Inc., Burbank, CA (US)

(72) Inventor: Steven T. Kosakura, Tustin, CA (US)

(73) Assignee: Disney Enterprises, Inc., Burbank, CA (US)

( * ) Notice: Subject to any disclaimer, the term of this patent is extended or adjusted under 35 U.S.C. 154(b) by 261 days.

(21) Appl. No.: 15/260,166

(22) Filed: Sep. 8, 2016

(65) Prior Publication Data

US 2018/0067331 A1    Mar. 8, 2018

(51) Int. Cl.
| | |
|---|---|
| *G02B 3/14* | (2006.01) |
| *F21V 14/02* | (2006.01) |
| *F21V 14/06* | (2006.01) |
| *G02B 26/10* | (2006.01) |
| *G02B 27/06* | (2006.01) |
| *G02B 27/09* | (2006.01) |
| *G02B 27/20* | (2006.01) |
| *G02B 27/42* | (2006.01) |

(52) U.S. Cl.
CPC ............ *G02B 27/425* (2013.01); *F21V 14/02* (2013.01); *F21V 14/06* (2013.01); *G02B 27/0944* (2013.01); *G02B 27/20* (2013.01); *G02B 3/14* (2013.01); *G02B 26/10* (2013.01); *G02B 27/06* (2013.01)

(58) Field of Classification Search
CPC .......... G02B 6/003; G02B 6/005; G02B 6/02; G02B 6/04; G02B 6/08; G02B 6/09; G02B 26/0808; G02B 26/0875; G02B 26/10; G02B 27/1086; G02B 27/18; G02B 27/20; G03B 2205/00; G03B 2205/0007; G03B 2205/0015; G03B 2205/0053; G03B 2205/0061; G03B 2205/0069; G03B 2205/0076; G03B 2205/0084; G03B 2205/0092; G03B 21/12; G03B 21/14; G03B 21/142; G06T 13/16; F42B 4/18
See application file for complete search history.

(56) References Cited

U.S. PATENT DOCUMENTS

| | | | | |
|---|---|---|---|---|
| 3,851,961 A | * | 12/1974 | Winzer | G09F 19/18 |
| | | | | 353/122 |
| 2011/0157483 A1 | * | 6/2011 | Reichow | G02B 27/2264 |
| | | | | 348/740 |
| 2013/0222771 A1 | * | 8/2013 | Tsubota | G02B 26/101 |
| | | | | 353/20 |

\* cited by examiner

*Primary Examiner* — Kimberly N Kakalec
(74) *Attorney, Agent, or Firm* — Dorsey & Whitney LLP

(57) ABSTRACT

One embodiment of the present disclosure may take the form of a projection module for projecting onto a projection surface. The projection module includes a light source emitting a beam of light, a diffractive optical element in optical communication with the light source, the diffractive optical element acts to split the beam of light into a plurality of diffracted light beams, a lens assembly in optical communication with the diffractive optical element and configured to converge the diffracted light beams onto the projection surface, and a motion assembly connected to at least one of the light source or the lens assembly. The motion assembly changes an orientation of the diffractive light beams relative to the lens assembly.

17 Claims, 6 Drawing Sheets

SYSTEM FOR SIMULATING PYROTECHNICS

FIELD

The present disclosure relates generally to light projection systems.

BACKGROUND

Pyrotechnics provide intensely bright naturally animated effects with enduring popularity. However, pyrotechnics involve explosive materials and rigorous safety measures. Additionally, due to the explosive materials, guests often have to be positioned at large distances from the origin of the explosion and the scene is typically outdoors, rather than in an indoor venue. Therefore, there exists a need to simulate explosions or other special effects, such as fireworks, cannon shots, gun shots, and so on, in a safe manner that will allow high repeatability and can be done in a variety of locations, including indoors.

SUMMARY

One embodiment of the present disclosure is a projection module for projecting onto a projection surface. The projection module includes a light source emitting beam of light, a diffractive optical element in optical communication with the light source and configured to split the beam of light into a plurality of diffracted light beams, a lens assembly in optical communication with the diffractive optical element, the lens converges the diffracted light beams onto the projection surface, and a motion assembly connected to at least one of the light source or the lens assembly. The motion assembly changes an orientation of the diffractive light beams relative to the lens assembly to vary the convergence point and position of the diffracted light beams.

Another embodiment of the disclosure is a projection system. The projection system includes a light element emitting a substantially coherent light beam, a grating element coupled to the light element and in optical communication therewith, a telescoping optical assembly in optical communication with the grating element, and a projection surface. When the light element is activated, the grating element separates the coherent light beam into a plurality of output beamlettes and transmits the plurality of output beamlettes to the telescoping optical assembly. In a first position, the telescoping optical assembly converges the plurality of output beamlettes in a first area on the projection surface and in a second position the telescoping optical assembly converges the plurality of output beamlettes in a second area of the projection surface.

Yet another embodiment of the disclosure includes an architectural lighting effects system. The system includes a scenic element including a surface and a projection module configured to selectively project onto the surface. The projection module includes a laser, a diffractive optical element in optical communication with the laser and configured to split a laser beam emitted from the laser into a plurality of diffracted light beams, an optical assembly in optical communication with the diffractive optical element and configured to converge the diffracted light beams in different locations on the surface, and a motion assembly coupled to one of the laser or the optical element and configured to cause the convergence of the diffracted light beams to vary in location on the surface.

SPECIFICATION

Overview

Figure 1:
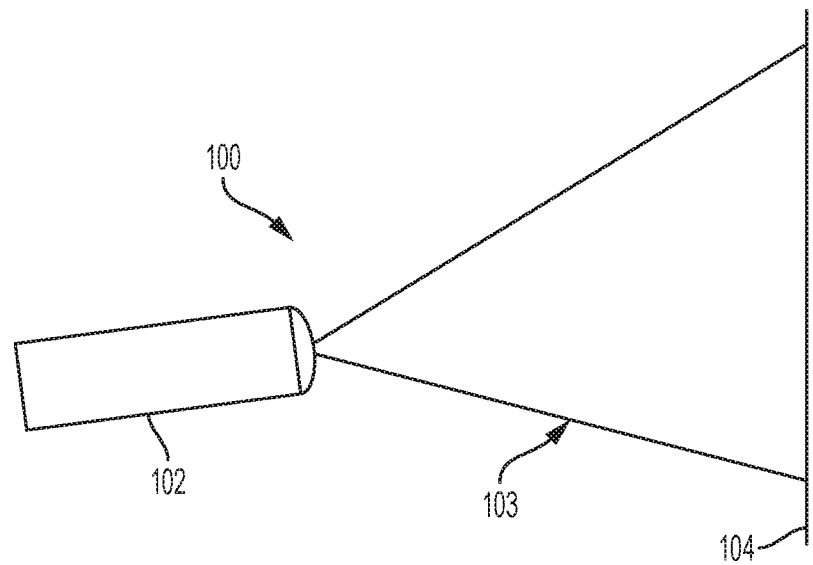
FIG. 1 is a system diagram illustrating a projection module projecting onto a projection surface.

The present disclosure is related to a projection module and method for replicating sparking effects, such as those due to an explosion or firework. The projection module projects a light source onto a projection surface and due to features of the projection module, the projected light is condensed to substantially a single point and then diverged so as to scatter on the same surface in a random or other desired pattern. The angular spread of the projected light and movement sequence can be controlled in order to achieve a particular effect. Similarly, the light color, intensity, or shape of the projected light can be varied depending on an artistic effect or the like.

The projection module includes a light source, a diffractive optical element, an optical assembly, and optionally a motion assembly or other component used to vary an optical path between the light source and the optical assembly. In operation, light from the light source is passed through the diffraction optical element and then through the optical assembly. The motion assembly or other optical path variation component varies the orientation of the light beams relative to the optical assembly such as by moving the optical assembly, moving the light source and diffractive optical element, or by varying the optical characteristics of the optical assembly. The motion assembly may use purely mechanical means (e.g., linkages, cams, etc.) and/or motor control (e.g., servos, rotary motors, linear motors, or the like) to change the optical path.

In examples with physical motion, the movement, which is typically both in the horizontal (X) and vertical (Y) directions (or along any axis depending on the original orientation), causes a variation in the spread of the light onto the projection surface, i.e., changes the projection locations of the light on the projection surface. In one embodiment, the movement pattern follows along a portion of an elliptical shape (when viewed in profile) such that the optical assembly moves initially away from the diffractive optical element, slightly upward, and then back toward the diffractive optical element. Using this movement pattern, along with a diffractive grating producing random dots, and a convex optical lens (or lenses) for the optical assembly, the projected light appears initially as a single dot and "explodes" outwards into many different dots that are randomly oriented. The light source may be turned off the movement, such as before the lens assembly is moved back towards the diffractive optical element, in order to terminate to prevent projection of the light as it re-converges. It should be noted that in some examples, the movement path may be stored on memory and executed by a computer or controller (e.g., processor, microcontroller, or field programmable gate array) to achieve a repeatable pattern or program.

In another example, the movement of the various light beams or dots may be controlled by an optical path variation component. For example, the output lens may be asymmetrically shaped or otherwise have non-uniform optical properties. In this example, the different portions of the optical lens can be aligned with the light source (as it exits the diffraction grating) at different points in time to create the movement of the projected light. As another example, the optical properties of the output lens may be changed over time (e.g., through a chemical or electrical process) such that the optical path of the light through the lens varies, although the position of the lens to the light source may not change. As yet another example, an optical medium may be positioned between the diffraction grating and the lens, where the medium changes the optical path of the light as it travels between the light source and the lens, e.g., a mirror, refractive medium, etc. The medium may or may not physically move in order to execute the change.

The projection module can be used with substantially any type of projection surface, including planar, three-dimensional, colored, and so on. Similarly, the projection module may be used in conjunction with front or rear projection systems. For example, the projection module can add additional effects that are displayed on top of projected visual content. The projection system can be incorporated into one or more attractions, such as being selectively activated along with a performance, or may be incorporated into a venue to enhance the aesthetics and improve the dynamic range.

DETAILED DESCRIPTION

FIG. 1 is a diagram illustrating the projection system 100 including the projection module 102 and the projection surface 104. With reference to FIG. 1, the projection module 102 projects light in a projection field 103 onto the projection surface 104. The projected light changes in shape, size, and location such that the projection field 103 varies in these same characteristics with the changes in the projected light. The projection module 102 can be stationary or movable relative to the projection surface 104 and may be a discrete element or incorporated into another projection element.

The projection surface 104 is substantially any type of surface, object, or element where projected light is visible. The projection surface 104 can be planar, three-dimensional, white, colored, and so on. The characteristics of the projection surface 104 will often vary based on the application for the projection system 100. For example, in some embodiments the projection surface 104 can be part of an architectural form and is shaped and colored to represent a scenic element (e.g., castle wall, battleship, etc.). Additionally, the projection surface 104 may be movable or rotatable based on a desired artistic effect or simulation. Further, the projection module 102 can be configured to project onto a front or rear surface of the projection surface 104.

Figure 2:
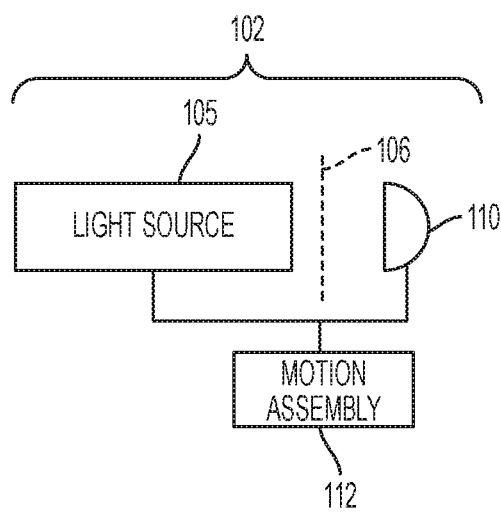
FIG. 2 is a simplified exploded view of one embodiment of the projection module of FIG. 1.

FIG. 2 is a simplified exploded view of a first embodiment of the projection module 102. With reference to FIG. 2, the projection module 102 includes a light source 105, a diffractive optical element 106, a lens assembly 110 or optical assembly, and a motion or drive assembly 112. The components are integrated into a single assembly or can be discrete components coupled together and/or in optical communication with one another.

The light source 105 is preferably a coherent or partially coherent light producing element such as a laser, light emitting diode, or may be a light producing element including a lens assembly for creating a coherent light source. In one embodiment, the light source 105 is a laser producing wavelengths falling within the visible spectrum (e.g., 390 to 700 nm). Additionally, the light source may be selected to be consistent with regulatory agencies and fall within a prescribed eye safe range. Further, the light source 105 is selected based on a desired aesthetic appearance and desired effect. To replicate sparks, for example, yellow or amber light source such as a laser around 593 nm range is used. However, as can be appreciated, depending on the desired effect, many other wavelengths that will reproduce other types of colors can be used.

For example, the light source 105 can include a mixture of color wavelengths, such as red and green, that when combined create another color. In this example, the wavelengths will be separated by the diffractive optical element, but can be recombined by movement of the lens assembly discussed below. This could be used to achieve a desired effect, such as simulating fireworks, that change color during different times of the explosion. As another example, the light source 105 can be a tunable laser and during use the color wavelength emitted can be varied to change the appearance of the emitted light.

The light source 105 is optically coupled to a diffractive optical element 106 which is used to split the light source 105 into a large number of waves or beams (output beamlettes). In one embodiment, the diffractive optical element 106 is a grating, but in other embodiments the element may be one or more lenses, prisms, aspheric, or the like. The diffractive optical element 106 can be a single optical element or two or more optical elements in combination with one another such sequentially aligned elements (e.g., a first diffraction grating pattern followed by a second diffraction grating pattern with a different density or configuration to create a more diffused point source or shape and this diffracted light may further be modified by passing it through additional diffraction material such as a sheet of rippled/wavy glass or the like). In embodiments where the system 100 is used to replicate an explosion, the diffractive optical element 106 is a diffractive grating producing a random pattern, such as one producing light beams having varying light intensities and optionally varying sizes in a random dispersion. An example of this type of diffractive grating can be purchased from companies such as BlissLights® or Laser2000®, such as the random pattern projector produced by Laser2000®.

With continued reference to FIG. 2, the lens assembly 110 or optic assembly acts to affect the focal length and convergence the diffracted light beams after they pass through the diffractive optical element 106. Accordingly, the lens assembly 110 is in optical communication with the light source 105 and the diffractive optical element 106. The lens assembly 110 is used to vary the convergence location and/or focal length of the diffracted light beams before they are projected onto the projection surface 104. In some embodiments, the lens assembly 110 reduces the spread of the diffracted light beams back toward a single point. That is, when the diffracted light beams reach the lens assembly 110 at a first orientation, the lens assembly 110 converges the diffracted light beams in the same location. When the diffracted light beams reach the lens assembly at a second orientation, the beams diverge and the lens assembly 110 directs the diffracted light beams in different locations from one another. In one embodiment, the lens assembly 110 may include one or more convex lens, as well as transmissive or reflective lenses or portions as well. However, other lens assemblies are anticipated as well. The lens 110 may also have varying optical properties based on the orientation of the lens, such as a non-uniform lens shape or material. In another example, the lens 110 may include dynamically variable optical properties that change based on the application voltage or a chemical reaction.

The motion assembly 112 is used to move the lens assembly 110 relative to the light source 105 and diffractive grating 106 or vice versa. The motion assembly 112 can be configured to follow one or more predetermined, repeatable, movement paths that correspond to a desired effect. In one embodiment, the motion assembly 112 transforms the lens assembly 110 into a telescoping lens assembly, such that the lens assembly 110 moves relative to the light source 105 and diffractive grating 106. The movement of the lens assembly 110 by the motion assembly 112 varies the convergence of the diffracted light beams on the projection surface 104 to create a desired effect. For example, the motion assembly 112 may move the lens assembly 110 from a first position where the diffracted light beams are converged toward the same location to a second location such that the diffracted light beams are directed in different locations. In other words, the motion assembly 112 varies the orientation and location of the diffracted light beams relative to the lens assembly 110 and the location of the diffracted light beams relative to the lens assembly 110 determines the convergence effect of the lens(es).

The motion assembly 112 is configured to move the lens assembly 110 and/or the light source 105 in a desired manner and may include one or more motors, servos, a track, or the like. In some embodiments, the motion assembly 112 is configured as a telescoping assembly for moving the lens assembly 110 in a telescoping manner. However, unlike conventional telescoping lenses that typically move along a single plane, the motion assembly 112 may be configured to move the lens assembly 110 in multiple planes. In particular, the motion assembly 112 is configured to move the lens assembly 110 along a horizontal axis and a vertical axis to create an arc or other non-linear movement path.

The motion assembly 112 may use mechanical and/or electronic components to generate the movement of the lens assembly 110 or light source 105. Examples include drive assemblies, gearing, linkages, cams, motors, computer controlled machine tools (e.g., computer numeric control), or the like. Additionally, in some instances, the motion assembly 112 is controlled by a computer or other control element that executes a stored program or instructions in order to drive the motion in a repeatable or otherwise desired manner. For example, a processor, microcontroller, FPGA, or the like, may be used in communication with a memory device, to generate motion along a movement path that generates the desired artistic effect.

The movement path is selected based on a desired artistic effect, as well as the angle of the projection module 102 relative to the projection surface. In short, the motion assembly 112 acts to vary the orientation and/or optical path of the diffracted light beams relative to the lens assembly 110, which in turn affects the converging effect of the lens assembly 110 on the diffracted light beams. In another embodiment, the motion assembly 112 includes a track that the lens assembly 110 slides along.

The motion assembly 112 may be modified based on the orientation of the projection module relative to a projection surface and on a desired effect. For example, in certain instances the movement assembly 112 may move the lens assembly or diffractive assembly in only a single plane to achieve a desired effect. For example, the output lens may be rotated along a rotation axis by the motion assembly 112.

In an embodiment where a simulated explosion is desired, the movement path is elliptically shaped such that the lens assembly 110 moves outward from the light source 105 and then upward and then back toward the light source 105.

Figure 3:
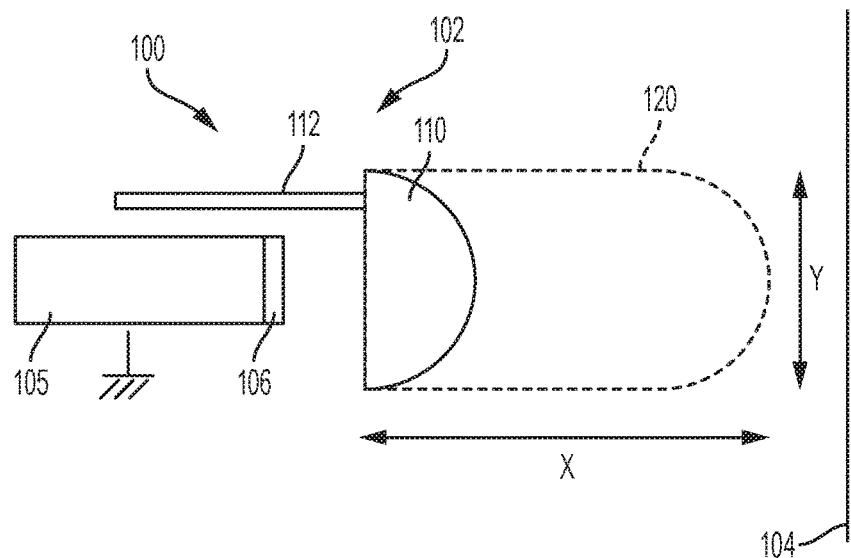
FIG. 3 is a simplified side elevation view of the projection module embodiment of FIG. 2 during projection.

FIG. 3 illustrates a diagram of a first embodiment of the motion assembly 112. With reference to FIG. 3, in this embodiment, the motion assembly 112 is connected to the lens assembly 110 and moves the lens assembly 110 in a movement path 120 that extends in both the horizontal (X axis) and vertical (Y axis) directions to create an elliptically shaped movement profile. In this embodiment, the light source 105 and diffractive optical element 106 are each fixed while the lens assembly 110 is moved relative thereto. The lens assembly 110 is sized and positioned so that as it is moved it remains in optical communication with the light source 105 and the diffracted beams of the light source so as to continue project the light beams during movement of the lens assembly.

Figure 4:
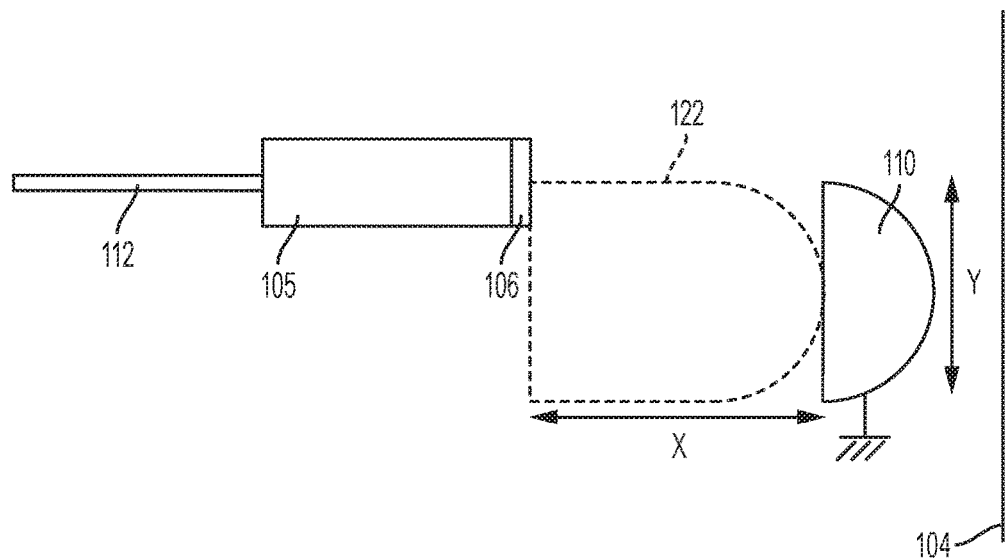
FIG. 4 is a simplified side elevation view of another embodiment of the projection module during projection.

FIG. 4 illustrates a diagram of a second embodiment of the motion assembly 112. In this embodiment, the lens assembly 110 remains stationary while the light source 105 and the diffractive optical element 106 move relative to the lens assembly 110. That is, the motion assembly 112 is coupled to the light source 105 and moves the light source in a movement path 122 relative to the lens assembly 110. In this example, the movement path 122 is the same as the movement path 120 in FIG. 3, but the light source 105 is moved, rather than the lens 110, and is moved in both the horizontal and vertical directions to create an arc-shaped path.

With the movement paths 120, 122 illustrated in FIGS. 3 and 4, the diffracted light beams from the diffractive optical element 106 are initially converged by the lens assembly 110 and directed on the same location of the projection surface 104. In this manner, the different beams appear as a single beam. As the lens assembly 110 and/or the light source 105 moves relative to the other along the elliptically shaped path, the diffracted beams diverge and are directed at different locations on the projection surface 104. This divergent projection results in the individual beams becoming more apparent and distinct. As the movement continues, the beams further spread out and in embodiments with a random dot pattern as the diffractive optical element 106, various dots are projected onto the projection surface 104 and the projected field 103 grows in size with the movement.

It should be noted that the lens assembly 110 or the light source 105 may travel along only a portion of the movement path 120, 122. For example, the lens assembly 110 may travel along only a portion of the elliptically shaped movement path in order to illustrate the initial converging and diverging effect without a secondary converging effect. Alternatively or additionally, the light source 105 may be selectively activated at various locations along the movement path 120, 122 in order to achieve a desired effect. For example, the light source 105 can be turned off when the lens 110 reaches the outer point of the elliptical path in order to control the effect.

Figure 5:
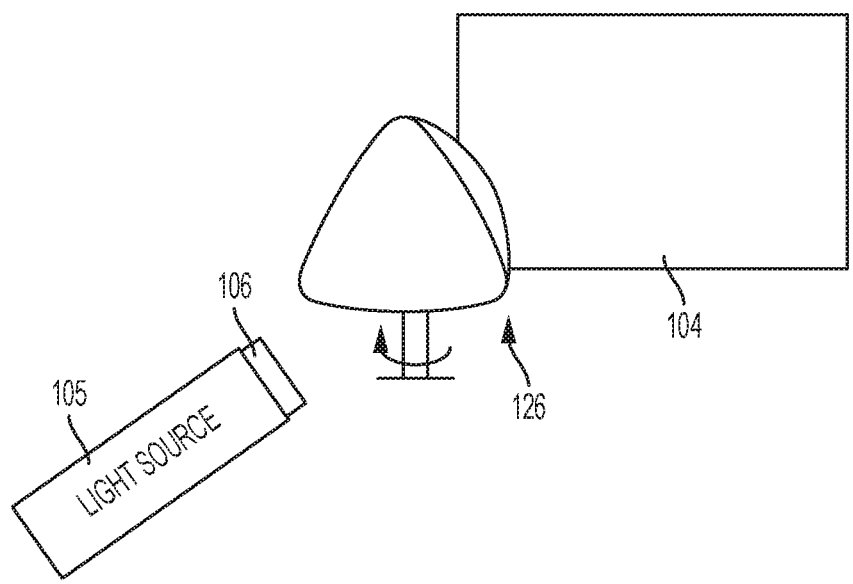
FIG. 5 is a simplified perspective view of another embodiment of the projection module during projection having an non-uniform lens.

FIG. 5 illustrates another example of the projection module 102. In this example, the lens assembly 126 may include a non-uniform, asymmetric, or arbitrary lens having varying optical properties. For example, the lens may have an asymmetric shape such that first portion of the lens have a first set of optical properties and a second portion of the lens may have a second set of optical properties. In this example, the lens 126 may be rotated on an axis, or otherwise moved, to selectively align the different portions of the lens 126 with the light source. As the light follows an optical path through the lens 126, the optical properties of the lens itself change based on the position of the lens, thus by rotating the lens, the optical path is changed, moving the projected location of the light on the projection surface 104. In the example shown in FIG. 5, the lens 126 is a triangularly shaped curved lens. The transmissive or reflective properties of the lens can also be varied to change the optical path.

In another example, the optical properties of the lens 126 are variable to generate a dynamic lens. In this example, the optical properties change such as a by a chemical reaction or application of a particular voltage that changes the material properties of the lens. In this manner, the lens 126 does not need to physically move relative to the light source 105, but is still able to vary the ultimate optical path to the projection surface 104 in order to change the projection location of the light on the projection surface 104. As a specific example, the lens 126 may include electro polymers that shift based on the application of certain voltages and this shift will cause a variation in the optical path of light through the lens 126, thus varying the projection location of the light beamlettes.

Figure 6:
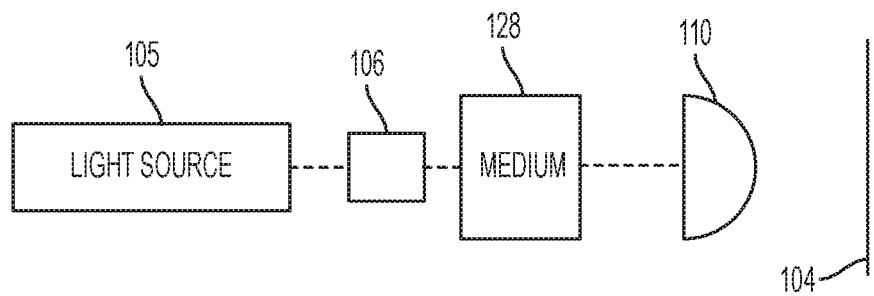
FIG. 6 is a simplified side elevation view of another embodiment of the projection module during projection including an optical path medium positioned between the light source and the lens.

FIG. 6 illustrates another example of the projection module 102. In this example, an optical medium is positioned between the lens 110 and the light source 105. The optical medium 128 may be the same or different from the lens 110, but is used to vary the optical path between the lens 110 and the light source 105 to generate a desired projection location for the light on the projection surface 104. The optical medium may be a refractive medium desired to cause the light vectors from the light source to animate in the desired manner. In some examples, the optical medium may include one or more mirrors or other reflective optics (e.g., concave and/or convex mirrors) that are moved into and out of the optical path between the light source and the lens 110 or the projection surface 104 to control the projection location of the beams.

In any of the various embodiments, mapping can be used to determine the shape or the movement of the lens or the light source relative to one another. For example, a mapped refraction can be used to determine a desired variability of the projection locations for the light through the desired animation and then using the required vectors, the optical properties of the system can be determined. By using this mapping, an optical system can be designed to generate the desired movement of the light on the projection surface, such as by doing a distortion mapping into a reflected surface and map from one space to another or one shape to another.

Figure 7A:
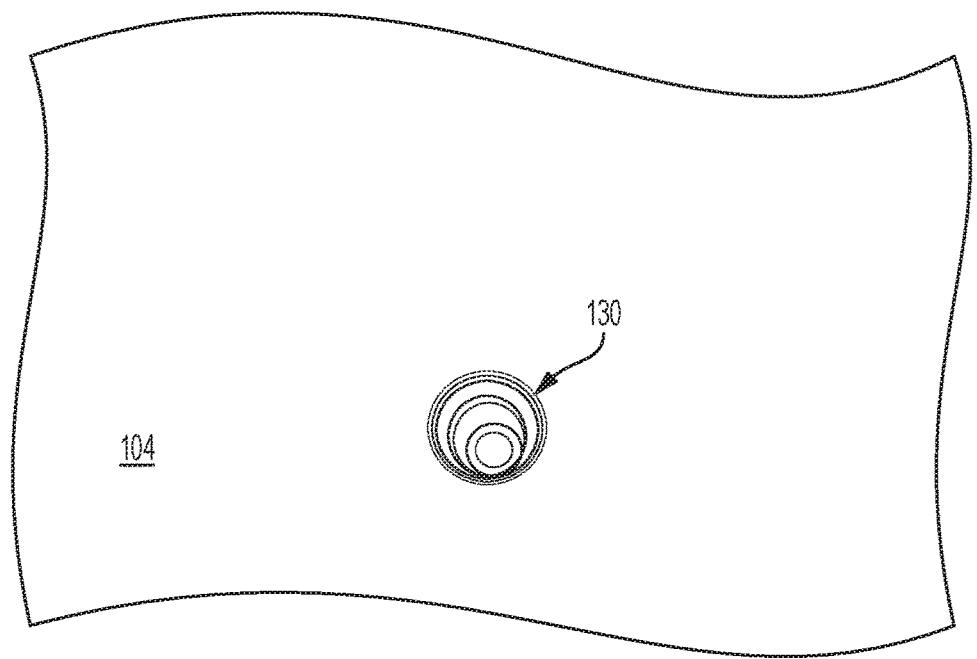
FIGS. 7A-7E illustrate images of the projection module during projection onto a projection surface from an initial projection to the end of a simulation.
Figure 7B:
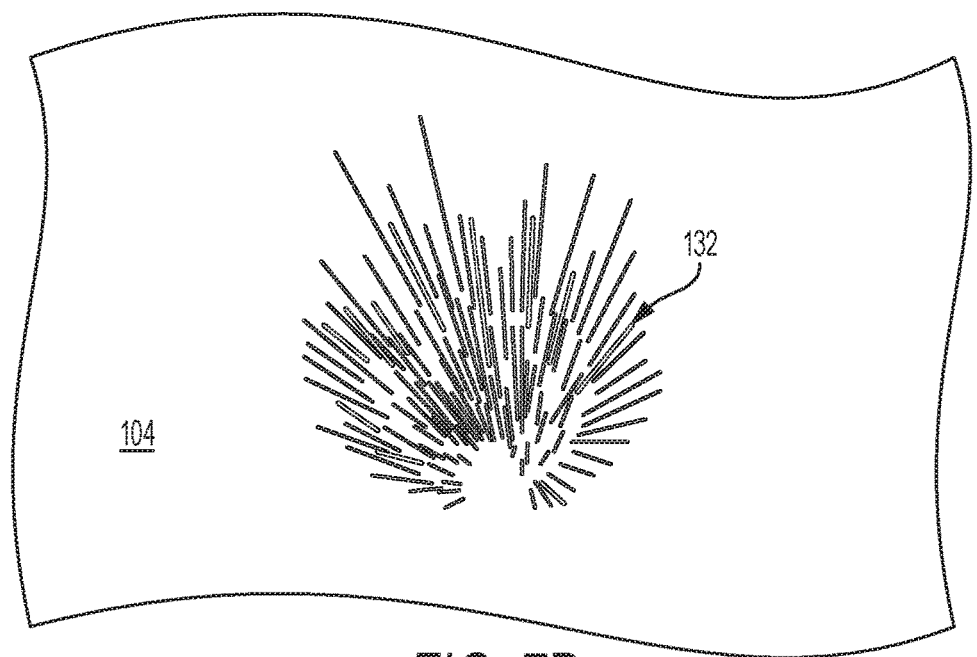
Figure 7C:
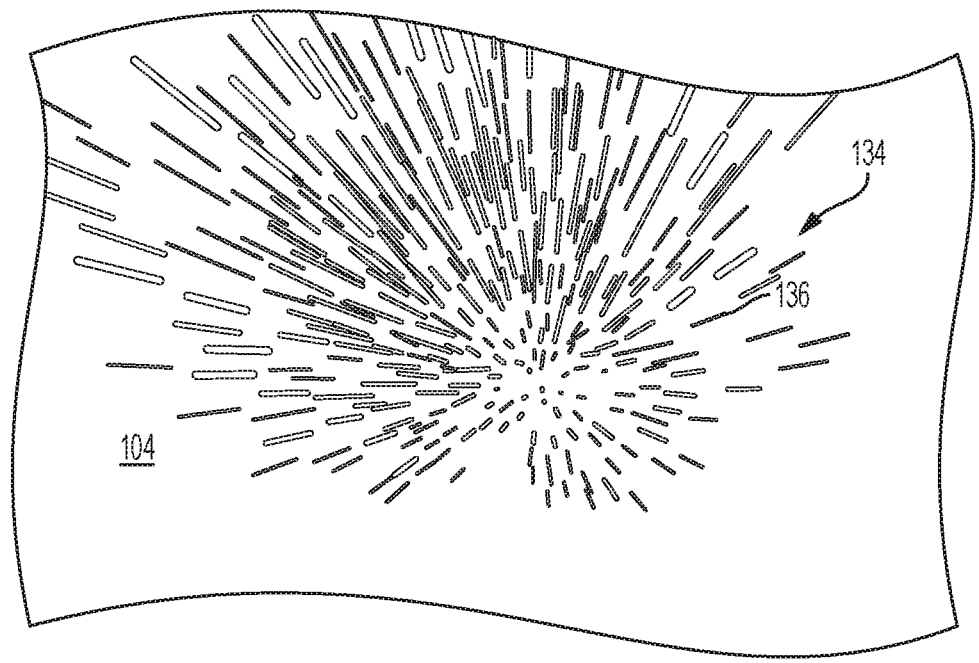

FIGS. 7A-7E illustrate various images of the projected light on the projection surface 104 using the projection module 102 of FIG. 3. With reference to FIG. 7A, with the lens assembly 110 in an initial position relative to the light source 105, upon activation of the light source 105 the projected light beams 130 are converged onto a small area on the projection surface 104 appearing substantially as a single point on the projection surface 104. With reference to FIG. 7B, as the lens assembly 110 is moved outward from the light source 105, the projected light 132 begins to spread outward on the projection surface 104 and the discrete diffracted light beams are able to be viewed. With reference to FIG. 7C, as the lens assembly 110 continues to move along the elliptically shaped path, the projected light 134 spreads out further on the projection surface 104 as the projected light field 103 radius expands. The discrete diffracted beams become more isolated and apparent.

Figure 7D:
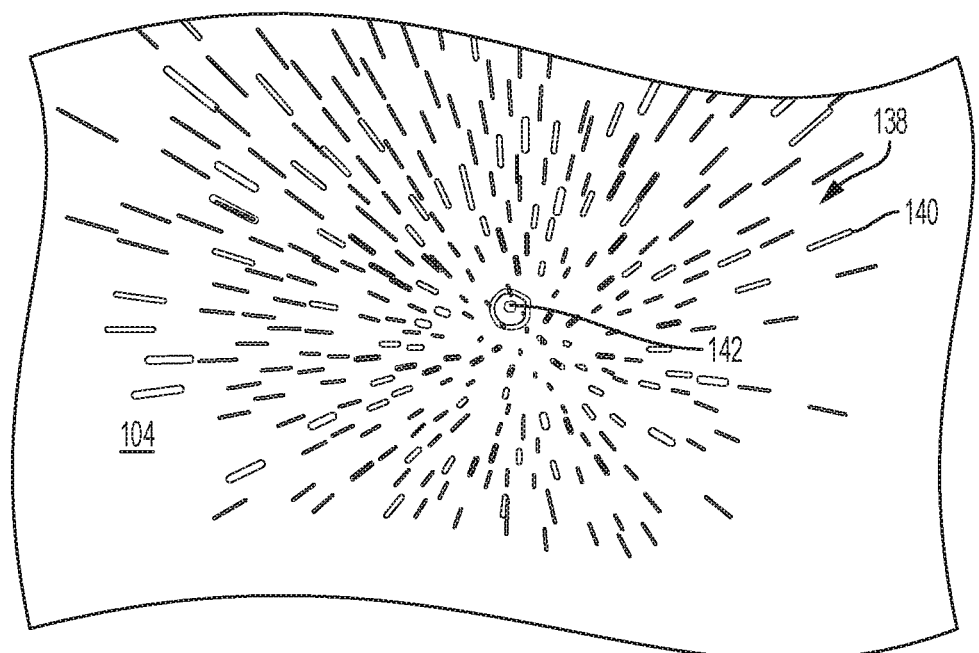
Figure 7E:
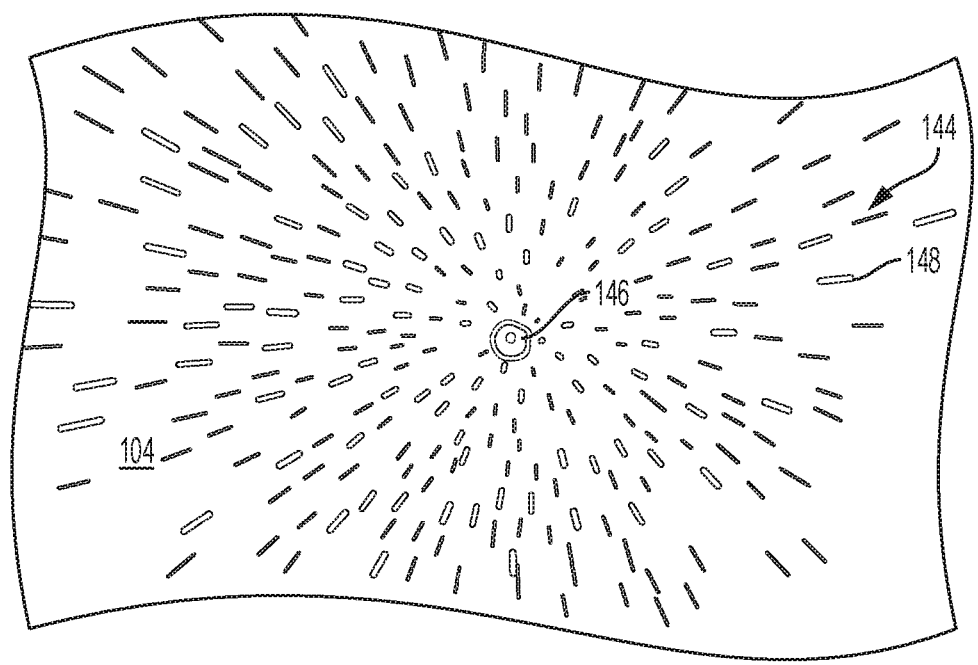

As shown in FIG. 7D, as the lens assembly 110 reaches the far point of the movement path 120, the projected light 138 spreads out farther and a bright origin beam at the zero origin 142 is in the center of the projected light 138 and the discrete beams 140 are arranged in a random pattern around this center 142. Finally, with reference to FIG. 7E, the projected light 144 is fully spread onto the projection surface 104 and the beams 148 are spatially separated from one another in a random pattern at different projection locations with the bright origin 146 still visible. In the examples illustrated in FIGS. 7A-7D, the light can be configured to represent a gravitational effect, i.e., appear to cause the light beamlettes to move under a gravitational pull, such as from the Earth. This appearance realistically represents particles from an explosion as they are drawn back to Earth after the force of the explosion.

The projection module 102 may be used with one more architectural lighting effects systems. In these embodiments, the projection module 102 is configured to project onto a surface, or multiple surfaces, of a scenic element and can be configured to be activated at a select time based on a performance. For example, the light source 105 can be activated at the same time an explosion sound and scenic pieces are mechanically moved to better replicate an explosion. Because the projection module 102 does not require actual explosive materials, the explosion simulation is highly repeatable, making it suitable for use in attraction parks which can often run attractions every day of the year for 15 or more hours a day.

CONCLUSION

It should be noted that while the present disclosure focuses on replicating sparking and explosion effects, the system may be used in many other applications. In particular, the projection module, diffraction gradient, and optical assembly can be modified as desired to create a desired effect by splitting a coherent light source and then controlling the angled spread of the light source in a desired manner. As such, the discussion of any particular embodiment is meant as illustrative only. Additionally, while the system has been discussed with reference to thematic uses, the projection system may also be used to enhance aesthetic characteristics of areas, such as outdoor areas, indoor venues, and the like.

In methodologies directly or indirectly set forth herein, various steps and operations are described in one possible order of operation, but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A projection module for projecting onto a projection surface comprising:
   a light source configured to selectively emit a beam of light;
   a diffractive optical element in optical communication with the light source, wherein the diffractive optical element splits the beam of light into a plurality of diffracted light beams;

a lens assembly in optical communication with the diffractive optical element, where the lens assembly converges the diffracted light beams onto the projection surface; and a motion assembly connected to at least one of the light source or the lens assembly, wherein the motion assembly displaces at least one of the light source or the lens assembly both in a vertical direction and a horizontal direction to vary an orientation of the diffractive light beams relative to the lens assembly to change a projection location of the diffracted light beams on the projection surface.

2. The projection module of claim 1, wherein the diffractive optical element is one or more diffractive gratings.

3. The projection module of claim 2, wherein the diffractive grating is a random dot producing grating.

4. The projection module of claim 1, wherein the motion assembly moves the light source or the lens assembly along a repeatable movement path.

5. The projection module of claim 1, wherein the light beam emitted from the light source is a coherent beam.

6. The projection module of claim 1, wherein the lens assembly comprises a convex lens.

7. The projection module of claim 1, wherein the motion assembly moves the light source or the lens assembly in at least two planes.

8. The projection module of claim 1, wherein the motion assembly moves the light source or the lens assembly horizontally and vertically.

9. A projection system comprising:
a light element emitting a substantially coherent light beam;
a grating element coupled to the light element and in optical communication therewith; and
a telescoping optical assembly in optical communication with the grating element and a projection surface; wherein
when the light element is activated, the grating element diffracts the coherent light beam into a plurality of output beams and transmits the plurality of output beams to the telescoping optical assembly;
in a first position the telescoping optical assembly converges the plurality of output beams in a first area on the projection surface; and
in a second position the telescoping optical assembly converges the plurality of output beams in a second area on the projection surface.

10. The projection system of claim 9, wherein the optical assembly transitions along a movement path between the first position and the second position and the plurality of output beams transition continuously from the convergence in the first area to the convergence in the second area.

11. The projection system of claim 10, wherein the movement follows a repeatable path.

12. The projection system of claim 9, wherein the telescoping optical assembly moves horizontally and vertically relative to the light element.

13. The projection system of claim 9, wherein the grating element is a random dot grating.

14. The projection system of claim 9, wherein the projection surface is three dimensional.

15. An architectural lighting effects system comprising:
a scenic element including a surface; and
a projection module configured to selectively project onto the surface, the projection module comprising:
a laser;
a diffractive optical element in optical communication with the laser and configured to split a laser beam from the laser into a plurality of diffracted light beams;
an optical assembly in optical communication with the diffractive optical element and configured to direct the diffracted light beams in different locations on the surface; and
a motion assembly coupled to one of the laser or the optical assembly to vertically displace and horizontally displace the respective laser or the optical assembly to cause the diffracted light beams to vary in location on the surface.

16. The architectural lighting effects system of claim 15, wherein the laser is activated as part of a performance.

17. The architectural lighting effects system of claim 15, wherein the motion assembly moves the laser or the optical assembly in two directional axes.

* * * * *